United States Patent [19]

Lacroix

[11] 4,095,911
[45] Jun. 20, 1978

[54] BLOCKING DEVICE FOR A HANDLE-BAR STEM

[75] Inventor: Bernard Lacroix, Montbeliard, France

[73] Assignee: Cycles Peugeot, Valentigney, France

[21] Appl. No.: 700,927

[22] Filed: Jun. 29, 1976

[30] Foreign Application Priority Data

Jul. 11, 1975 France .................. 75 21911

[51] Int. Cl.² .............................. F16B 2/14
[52] U.S. Cl. .................. 403/104; 403/374; 403/370; 85/67
[58] Field of Search ............ 403/374, 369, 110, 370, 403/104; 85/67, 87, 79

[56] References Cited

U.S. PATENT DOCUMENTS

| | | | |
|---|---|---|---|
| 1,349,437 | 8/1920 | Royer | 85/79 |
| 1,364,496 | 1/1921 | Weaver | 403/370 |
| 1,953,636 | 4/1934 | Skelton | 85/67 |
| 2,430,524 | 11/1947 | Miller | 403/370 |

FOREIGN PATENT DOCUMENTS 267,177 6/1950 Switzerland .................. 403/110

Primary Examiner—Andrew V. Kundrat
Attorney, Agent, or Firm—Sughrue, Rothwell, Mion, Zinn and Macpeak

[57] ABSTRACT

The plunger tube of the handle-bar stem adapted to be blocked in the fork tube of the vehicle is provided at its end with at least one inclined outer face. A nut adapted to cooperate with the inclined face has the same number of inclined faces which are inclined in the opposite direction. An expanding member is tightened against each face of the tube and against the corresponding face of the nut and urged outwardly by the translation of the nut axially of the plunger tube so that the nut bears against the fork tube and blocks the two tubes.

4 Claims, 3 Drawing Figures

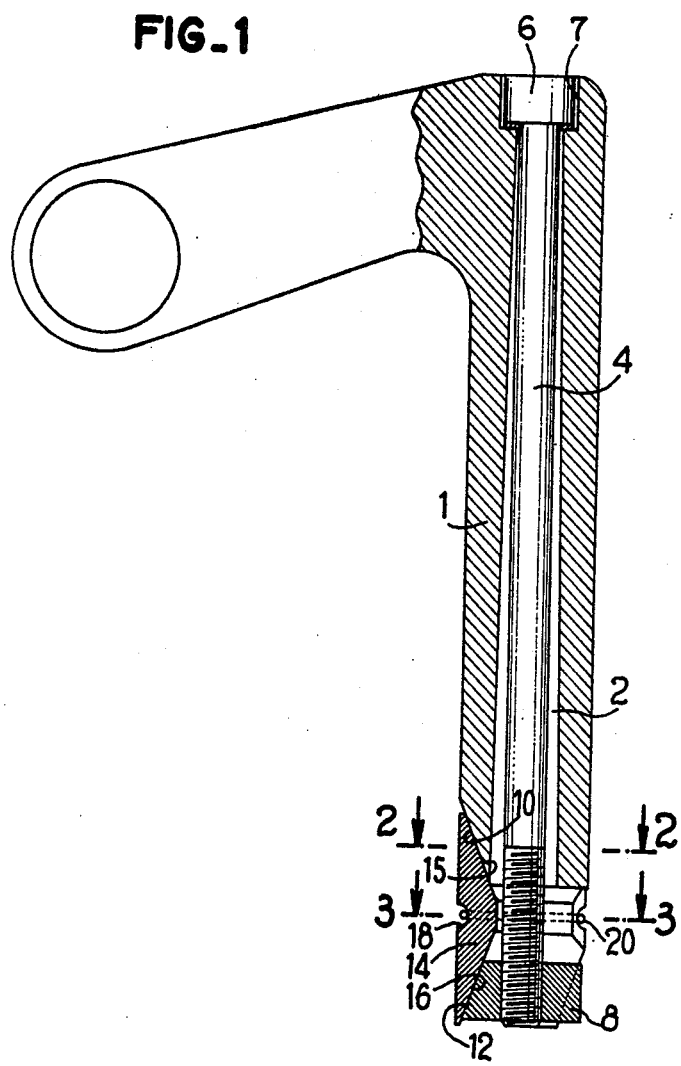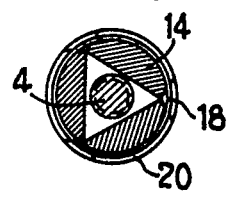

BLOCKING DEVICE FOR A HANDLE-BAR STEM

The present invention relates to the blocking of handle-bar stems in the tube of the fork of a vehicle having two wheels or a like vehicle.

Usually, this blocking is achieved by means of a screw disposed axially in the plunger tube of the handle-bar stem and associated either with a conical nut which is engaged in the lower end of this tube, the latter being split so as to facilitate its expansion, or with a nut provided with an extension in the form of a wedge which slides against the end of the tube which end is machined in a corresponding manner and is urged outwardly. Unfortunately, this displacement of the end of the wedge and the expansion of the tube is very localized and this creates excessive forces on the fork tube. Consequently, the fixing against rotation is often insufficient. Moreover, the conical nut becomes wedged in the plunger tube and an effort is required to push the nut downwardly when it is desired to untighten the handle-bar stem, for example when adjusting the height of the latter.

An object of the invention is to overcome these drawbacks by both increasing the effectiveness of the blocking and rendering the latter reversible.

According to the invention, there is provided a blocking device comprising a screw extending axially through the plunger tube and associated outside the plunger tube with a tightening nut, at least one outer face machined on a bevel in the lateral wall of the plunger tube in the vicinity of its free end, a similar inclined face machined on the outer face of the nut, and expanding means in the form of a double wedge bearing against each one of the bevelled faces of the tube and against the corresponding flat face of the nut and urged outwardly by the displacement of the nut on the screw.

Preferably, the expanding means has a curved outer surface in the form of a portion of a cylinder which is capable of marrying up with the shape of the fork tube and provides a relatively large bearing surface which ensures high effectiveness of the blocking. Furthermore, the nut is prevented from rotating by the cooperation of the bevelled surface with the wedge means whereas its axial displacement permits an increase or a decrease in the contact between the fork tube and the expanding means and consequently a regulation of the blocking.

In order to increase the effectiveness of the assembly, a plurality of bevelled faces are preferably arranged on the periphery of the tube and nut, an expanding means being in contact with each one of the faces of the tube.

The ensuing description of one embodiment of the invention, given solely by way of example with reference to the accompanying drawing, will bring out the advantages and features of the invention.

In the drawing

FIG. 1 is an axial sectional view of a blocking device according to the invention;

FIG. 2 is a sectional view taken on line 2—2 of FIG. 1, and

FIG. 3 is a sectional view taken on line 3—3 of FIG. 1.

The handle-bar stem shown in FIG. 1 comprises in the known manner a plunger tube 1 which has extending axially therethrough a bore 2 in which a rod 4 is disposed and blocked axially by a head 6 inserted in an enlarged part 7 of the bore 2. This rod 4 has a screwthreaded end portion which extends beyond the lower part of the plunger tube 1 and is associated with a tightening nut 8. At this lower end, the tube 1 has at least one end face 10 machined on a bevel. Likewise, the nut 8 has a face 12 in alignment with the face 10 but inclined in the opposite direction. The number of faces 12 is the same as the number of faces 10.

An expanding means 14, in the form of a double wedge, comprises opposite faces, of which faces faces 15 correspond to faces 10 and faces 16 to faces 12. Faces 15 and 16 respectively bear against the plunger tube 1 and against the nut 8 on at least one line parallel to the direction of the bevel.

In the illustrated embodiment, which is the preferred embodiment, the tube 1 has three faces 10 and the nut 8 has three faces 12 and three expanding means 14 are arranged at equal distances apart on the periphery of the tube and nut. The three means 14 each have their apex directed toward the axis of the tube 1 and have curved outer faces each of which forms a portion of a cylinder. Each of these expanding means 14 is provided with a peripheral groove 18 in its median part and the three grooves are aligned on a common circle. An elastically yieldable ring 20 placed in these grooves surrounds the expanding means 14 and hold them against the tube and nut.

The outer faces of the expanding means 14 have diameters which substantially correspond to the inside diameter of the fork tube (not shown). Consequently, when the rod 4 is screwed in the nut 8, the latter moves along the screwthreaded portion of the rod and approaches the plunger tube 1 without rotating. It urges each expanding means 14 upwardly and outwardly so that the expanding means 14 slide along the surface 10 of the plunger tube 1 until it is blocked or jammed in the fork tube and prevents any relative displacement between the two tubes. The bearing surface between the expanding means 14 and the fork tube is relatively large so that this blocking is effective, and yet there is practically no risk of deterioration of the fork tube.

Inversely, when the rod 4 is rotated in the opposite direction and untightens the nut 8, the latter moves away from the tube 1 and allows the expanding means 14 to slide downwardly. At this moment, the ring 20 urges the expanding means 14 inwardly of the plunger tube 1 and separates them from the fork tube. The blocking is in this way released and the handle-bar stem can be displaced with respect to the fork-tube with no risk of deterioration of the blocking device. The latter is thereafter very easily put back into operation by a simple action on the head 6 of the rod 4.

It will be understood that the number of faces 10 and 12 of the nut and tube and the number of expanding means may vary in accordance with the shape and dimensions of the handle-bar stem and fork tube. However, they must remain sufficiently small in number in order to prevent rotation of the nut with the screwthreaded rod 4 and rotation of the expanding means with respect to the plunger tube 1.

If desired, the angles of inclination of the inclined faces of the tube and nut and the angles of inclination of the faces of the expanding means may be modified in order to prevent the reversibility of the blocking system.

The bevelled faces 10 and 12 are preferably flat as shown in FIG. 2 so that the expanding means is in contact therewith on a relatively large surface. These faces 10 and 12 may also be curved or have a more complex shape which however allows them to be in contact with the expanding means on at least one line parallel to the general direction of the bevel and thereby ensures a good tightening of the expanding means against the fork tube, and the planar faces of said double wedges as shown in FIGS. 2 and 3 terminate in spaced lateral edges engaging those of an adjacent double wedge along the medial plane of the wedges with the outer peripheries of said double wedges contiguous with the outer periphery of said plunger tube.

Having now described my invention what I claim as new and desire to secure by Letters Patent is:

1. In a structure comprising in combination: a handlebar stem having a cylindrical plunger tube for insertion in a cylindrical fork tube of a wheeled vehicle, and a device for blocking the plunger tube in the fork tube; the improvement comprising in combination a tightening screw extending through the plunger tube in coaxial and rotatable relation to the plunger tube, a nut screwthreadedly engaged on and coaxial with the screw, the plunger tube defining at least three first bevelled faces in the vicinity of a lower end of the plunger tube, the nut defining a number of second bevelled faces corresponding to the number of first-bevelled faces, the second faces of the nut being upwardly convergent and the first faces of the plunger tube being downwardly convergent relative to the axis of the plunger tube, and expanding means comprising a number of double wedges arranged around the axis of the screw corresponding to the number of first-bevelled faces, each double wedge having a planar bevelled third face and a planar bevelled fourth face respectively bearing laterally against a corresponding first face of the tube and a corresponding second face of the nut, said first, second, third and fourth faces having in planes perpendicular to the axis of the plunger tube a rectilinear contour whose radius is centered on the axis of the plunger tube, and the planar faces of said double wedges terminate in spaced lateral edges which are in engagement with those of an adjacent double wedge along the median plane transverse thru said double wedges, with the outer peripheries of said double wedges contiguous with the outer periphery of said plunger tube, the screw having an enlarged end portion which is in axial abutting relation to the stem and is accessible from outside the stem, and the screw being cooperative with the nut to urge the double wedges radially outwardly against the fork tube by axial displacement of the nut on the screw upon rotation of the screw relative to the plunger tube, and means for retaining the double wedges between the plunger tube and the nut.

2. A structure as claimed in claim 1, comprising means for biasing the expanding means radially inwardly against said first and second faces.

3. A structure as claimed in claim 1, wherein each double wedge defines an outer face which is curved in the form of a portion of a cylinder for substantially fitting against the fork tube.

4. A structure as claimed in claim 1, wherein the first, second, third and fourth faces are planar.

* * * * *